United States Patent [19]
Watanabe

[11] Patent Number: 5,812,187
[45] Date of Patent: Sep. 22, 1998

[54] ELECTRONIC ENDOSCOPE APPARATUS

[75] Inventor: Akira Watanabe, Tokyo, Japan

[73] Assignee: Olympus Optical Co., Ltd., Tokyo, Japan

[21] Appl. No.: 845,051

[22] Filed: Apr. 21, 1997

Related U.S. Application Data

[63] Continuation of Ser. No. 563,353, Nov. 28, 1995, abandoned, which is a continuation of Ser. No. 202,824, Feb. 28, 1994, abandoned.

[30] Foreign Application Priority Data

May 21, 1993 [JP] Japan ................................ 5-120212

[51] Int. Cl.$^6$ .................................................. H04N 11/18
[52] U.S. Cl. ............................... 348/70; 348/65; 348/66; 348/69
[58] Field of Search .................... 348/65, 66, 70, 348/71, 68, 67, 69; 600/101, 160, 164, 165

[56] References Cited

U.S. PATENT DOCUMENTS

| | | | |
|---|---|---|---|
| 4,613,899 | 9/1986 | Kuwano et al. | 358/88 |
| 4,757,386 | 7/1988 | Sanner | 358/213 |
| 4,870,488 | 9/1989 | Ikano et al. | 348/70 |
| 4,875,091 | 10/1989 | Yamada et al. | 348/70 |
| 4,926,258 | 5/1990 | Sasaki et al. | 348/70 |
| 5,006,928 | 4/1991 | Kawajiri et al. | 348/70 |
| 5,032,913 | 7/1991 | Hattori et al. | . |
| 5,164,824 | 11/1992 | Ieoka et al. | . |
| 5,233,416 | 8/1993 | Inoue | 348/70 |
| 5,309,227 | 5/1994 | Inoue | 348/66 |
| 5,325,190 | 6/1994 | Nagasaki et al. | 348/270 |
| 5,374,953 | 12/1994 | Sasaki et al. | 348/65 |
| 5,387,928 | 2/1995 | Nishimura | 348/70 |

FOREIGN PATENT DOCUMENTS

| | | | |
|---|---|---|---|
| 2-172436 | 7/1990 | Japan | . |
| 2-221225 | 8/1990 | Japan | 348/66 |
| 3-24513 | 2/1991 | Japan | . |
| 3-123530 | 5/1991 | Japan | . |
| 3-270392 | 12/1991 | Japan | . |

*Primary Examiner*—Amelia Au
*Assistant Examiner*—Anand S. Rao
*Attorney, Agent, or Firm*—Armstrong, Westerman, Hattori, McLeland & Naughton

[57] ABSTRACT

An electronic endoscope apparatus is of a field-sequential imaging type, comprising an illuminating unit for illuminating an object by sequentially emitting color illumination rays with a plurality of different wavelengths and an imaging device for photoelectrically transforming the object image formed with the color illumination rays emanating from the illuminating unit. The electronic endoscope includes a drive circuit for driving the imaging device so as to read the locations in the imaging device associated with only one of two fields, image memories for storing video signals representing the object image formed with the color illumination rays and having been read from the imaging device, and memory control units for reading color video signals from the image memories in synchronization with a vertical-synchronizing signal.

7 Claims, 8 Drawing Sheets

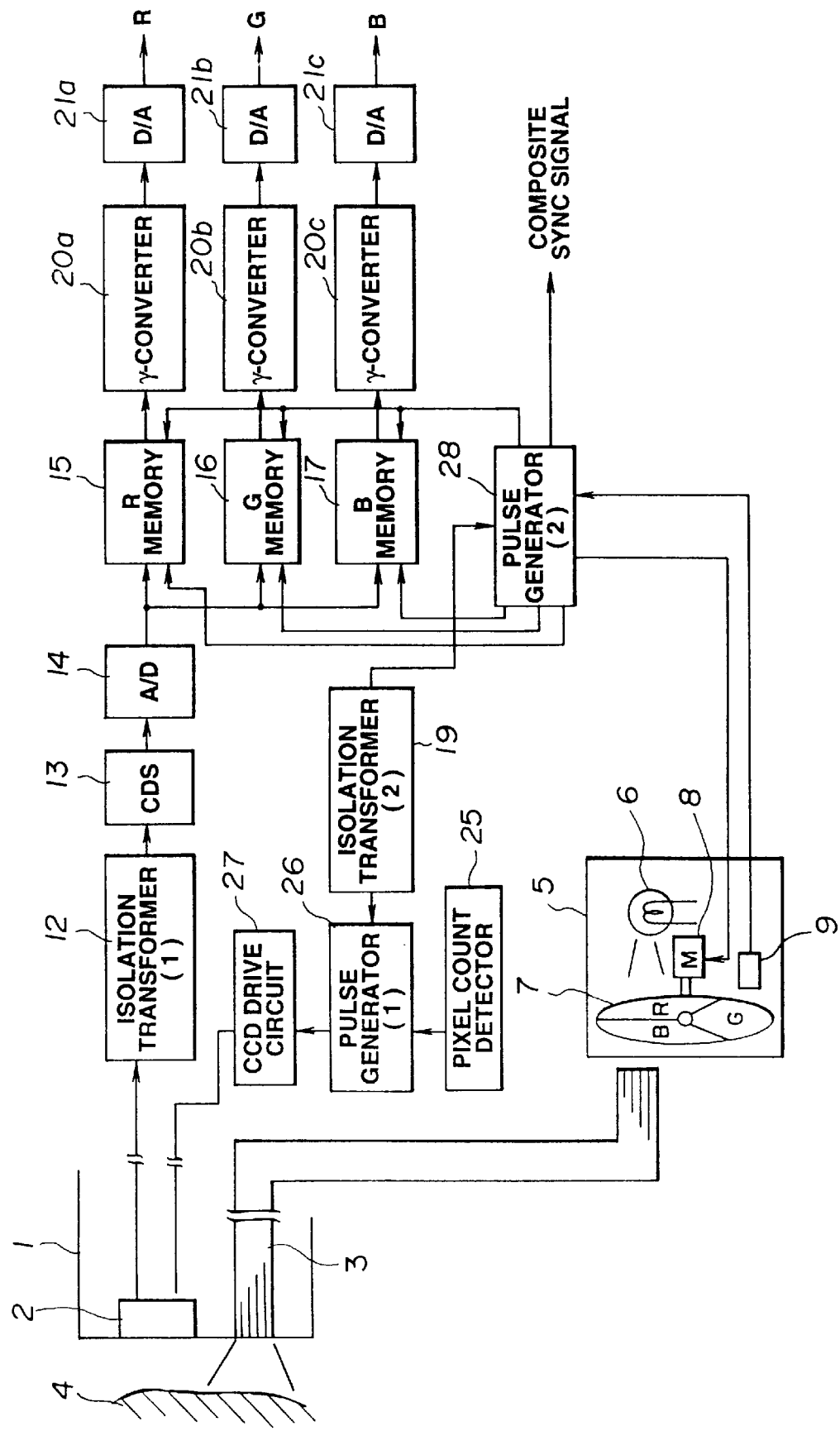

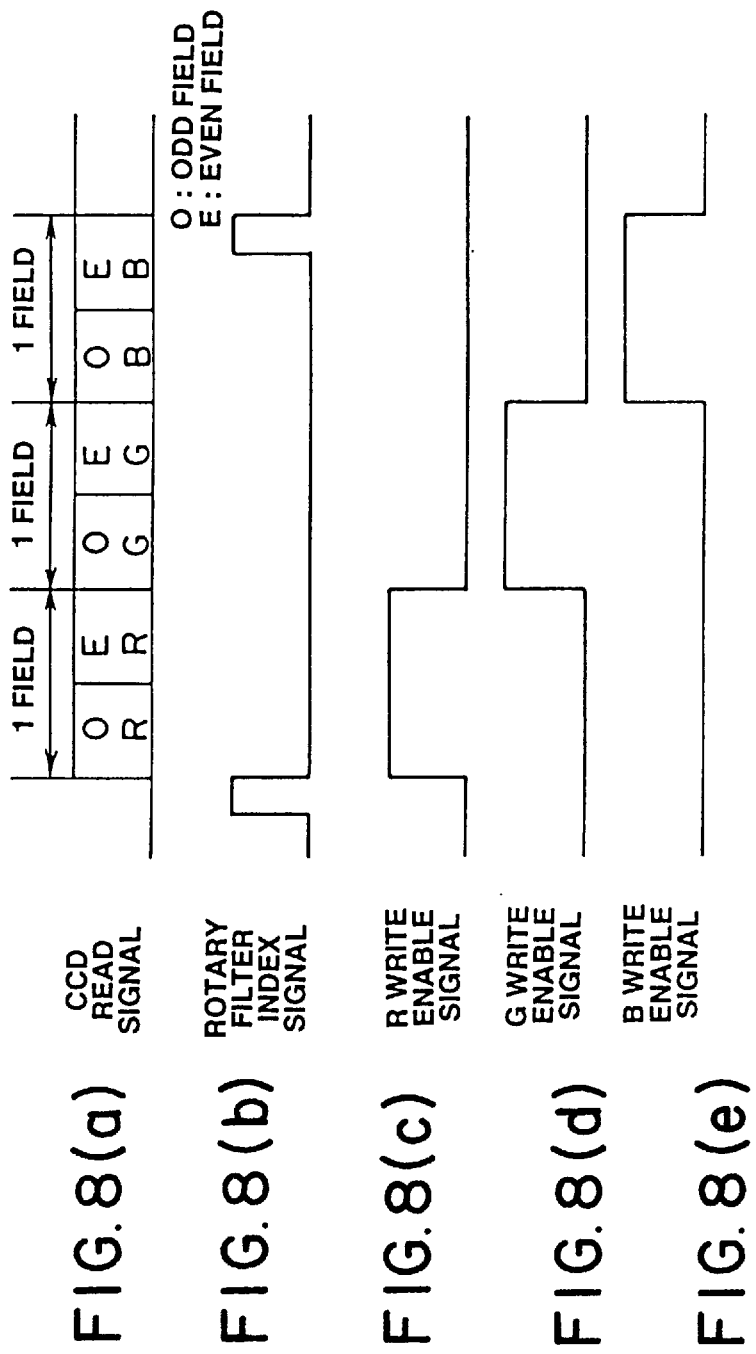

FIG.9(a) MEMORY WRITE SIGNAL

FIG.9(b) R MEMORY READ SIGNAL

FIG.9(c) G MEMORY READ SIGNAL

FIG.9(d) B MEMORY READ SIGNAL

FIG.9(e) VERTICAL-SYNCHRONIZING SIGNAL

FIG.9(f) COMPOSITE SYNC SIGNAL

O : ODD FIELD
E : EVEN FIELD

ELECTRONIC ENDOSCOPE APPARATUS

This application is a continuation of application Ser. No. 08/563,353 filed Nov. 28, 1995, now abandoned, which is a continuation of application Ser. No. 08/202,824 filed Feb. 28, 1994, now abandoned.

BACKGROUND OF THE INVENTION

1. Field of the Invention

The present invention relates to an electronic endoscope apparatus in which color illumination rays of red, green, and blue with a plurality of different wavelengths are emitted sequentially to a viewable region of an object, a solid-state imaging device is driven in a field-sequential imaging mode in order to read video signals originating from the red, green, and blue color rays, and then a view is displayed as a frame image in a screen on a monitor.

2. Description of the Related Art

An electronic endoscope apparatus has a solid-state imaging device such as a charge-coupled device (CCD) in the distal part of an insertional part designed to be inserted into a body cavity, wherein the solid-state imaging device photoelectrically transforms an object image, a processor carries out predetermined signal processing, and then an image of a viewable region appears in a screen on a monitor. The electronic endoscope apparatus allows a plurality of people to view images on the monitor simultaneously, whereby the people can cooperate in proceeding with treatment smoothly. Moreover, the electronic endoscope apparatus enables image processing, and offers excellent recording and storing efficiency. The electronic endoscope apparatus is winning more and more popularity with the improvement of performance of the imaging device.

The electronic endoscope apparatus is in general based on a so-called field-sequential imaging type endoscope apparatus. In the field-sequential imaging type endoscope apparatus, a solid-state imaging device formed on a single substrate is employed in an attempt to reduce the diameter of an insertional part and improve image quality. Color illumination rays of red, green, and blue are emitted sequentially to an object. A video signal originating from a ray of one color emitted during one emission period is regarded as a video signal related to one field. Color images of red, green, and blue are formed for each field. Video signals representing the color images related to one field are superposed to composite the color images.

This kind of a field-sequential imaging type electronic endoscope apparatus has been disclosed in Japanese Patent Laid-Open No. 2-172436 or 3-123530. In the disclosed electronic endoscope apparatus, color illumination rays of red, green, and blue are emitted sequentially to an object in units of one field. A solid-state imaging device produces color video signals, composites the color video signals field by field, and then displays the image signals related to both an odd field and an even field as a frame image on a monitor. In this conventional electronic endoscope apparatus, scanning is repeated for each field or shifted from an odd field to an even field. Color video signals related to one field may include both color video signals related to an odd field and those related to an even field. In order to eliminate vertical jitter, one-half horizontal-scanning-period delay lines have been connected to the output terminals of image memories designed for synchronization. Alternatively, a means has been installed to delay a horizontal-synchronizing signal for indicating the timing of reading the memories by a half of a horizontal scanning period.

As described above, in the conventional field-sequential imaging type electronic endoscope apparatus, the solid-state imaging device is driven and scanned to produce an odd field or an even field for every second field. Color video signals related to one field may therefore include both color video signals related to an odd field and those related to an even field. A view therefore contains vertical jitter, which results in an unclear image. For avoiding the vertical jitter, it is essential to include one-half horizontal-scanning-period delay lines or a means for delaying the timing of reading the image memories by a half of a horizontal scanning period for each field. This makes the configuration of the apparatus complex, leading to an increase in size or cost of the apparatus.

OBJECTS AND SUMMARY OF THE INVENTION

An object of the present invention is to provide a field-sequential imaging type electronic endoscope apparatus having a simple configuration and still producing a satisfactory view without vertical jitter.

Another object of the present invention is to provide a field-sequential imaging type electronic endoscope apparatus for grouping together color video signals, which have been synchronized in and read from image memories, field by field, and having a simple configuration and still preventing occurrence of vertical jitter in each field represented by video signals.

Yet another object of the present invention is to provide a field-sequential imaging type electronic endoscope apparatus for selecting a procedure of reading an imaging device according to the number of pixels permitted by the imaging device employed, enabling effortless use of a variety of imaging devices permitting different numbers of pixels under the control of the same circuitry, and producing satisfactory views by effecting an imaging mode determined according to the number of pixels.

The present invention provides a field-sequential imaging type electronic endoscope apparatus comprising an illuminating means for illuminating an object by sequentially emitting color illumination rays with a plurality of different wavelengths, and an imaging device for photoelectrically transforming an object image formed with the color illumination rays emanating from the light-emitting means.

The field-sequential imaging type electronic endoscope apparatus further comprises a driving means for driving the imaging device so as to read the locations in the imaging device associated with only one of two fields, image memory means for storing video signals representing the object image formed with the color illumination rays and having been read from the imaging device, and memory control means for reading the color video signals from the image memory means in synchronization with a vertical-synchronizing signal.

Other features and advantages of the present invention will be fully apparent from the description below.

BRIEF DESCRIPTION OF THE DRAWINGS

FIG. 1 is a block diagram showing an overall configuration of an electronic endoscope apparatus;

FIG. 2 is a timing chart showing the timing of reading a a CCD and writing image memories;

FIG. 3 is a timing chart showing the timing of reading the image memories;

FIG. 6(a) shows an input/output characteristic for gamma correction to be performed with respect to a gamma value fixed to 0.45;

FIG. 6(b) shows an input/output characteristic for enhancement to be performed at a certain signal level L1;

FIG. 6(c) shows an input/output characteristic for suppression to be performed at the signal level L1;

FIGS. 7 to 9 relate to the second embodiment of the present invention;

FIG. 7 is a block diagram showing an overall configuration of an electronic endoscope apparatus;

FIG. 8 is a timing chart showing the timing of reading a CCD and writing image memories when a CCD employed permits a limited number of pixels; and FIG. 9 is a timing chart showing the timing of reading the image memories when a CCD employed permits a limited number of pixels.

DETAILED DESCRIPTION OF THE PREFERRED EMBODIMENTS

Figure 1:
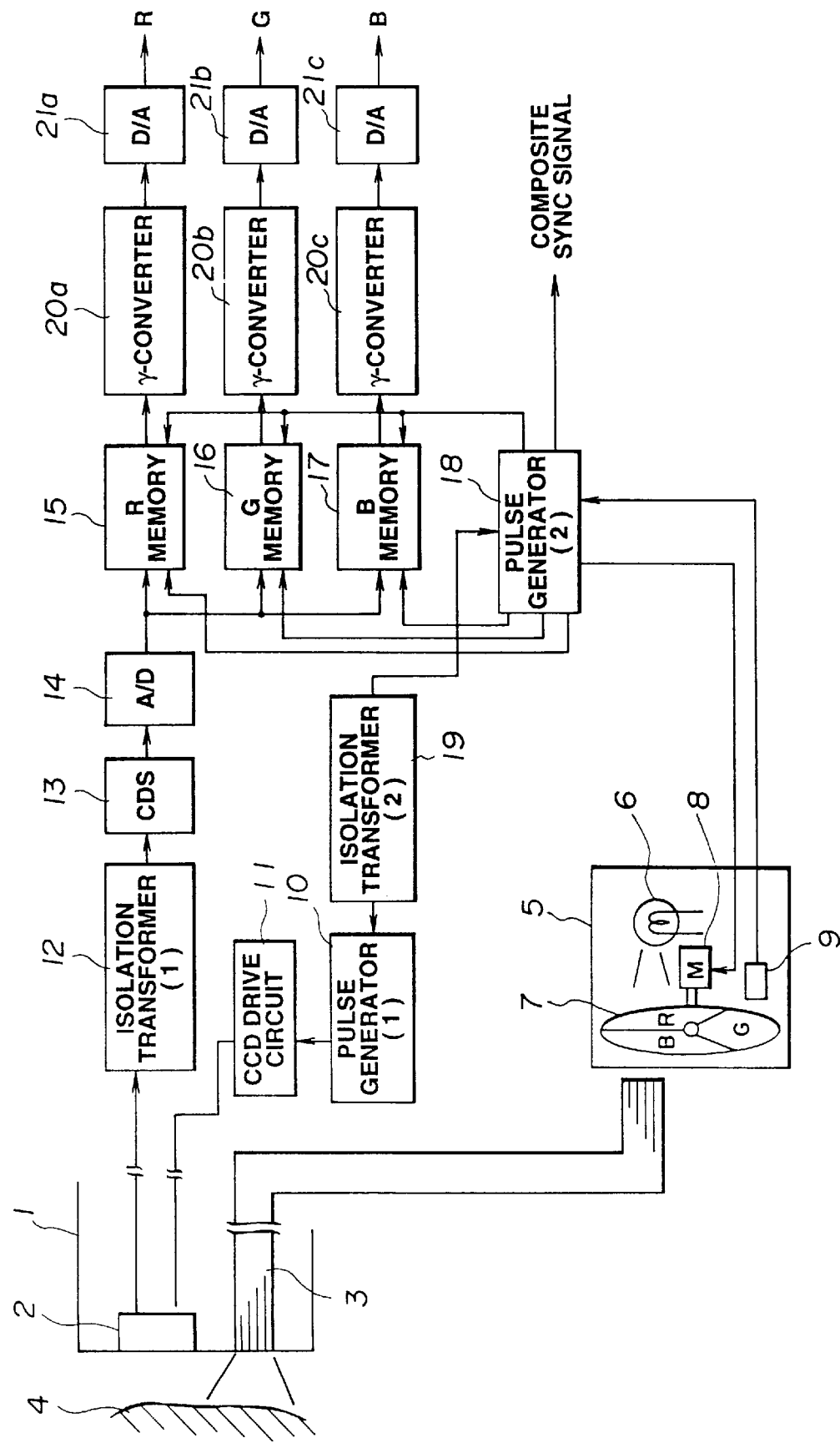
FIGS. 1 to 3 relate to the first embodiment of the present invention.
Figure 2:
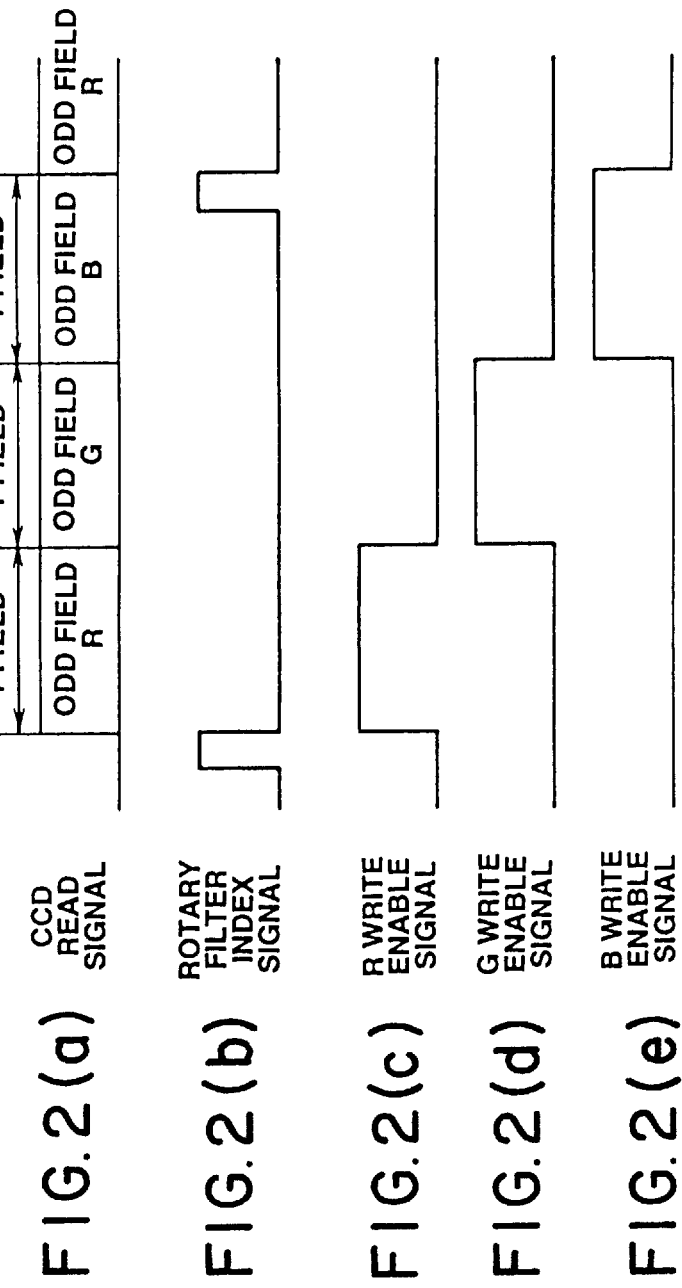
Figure 3:
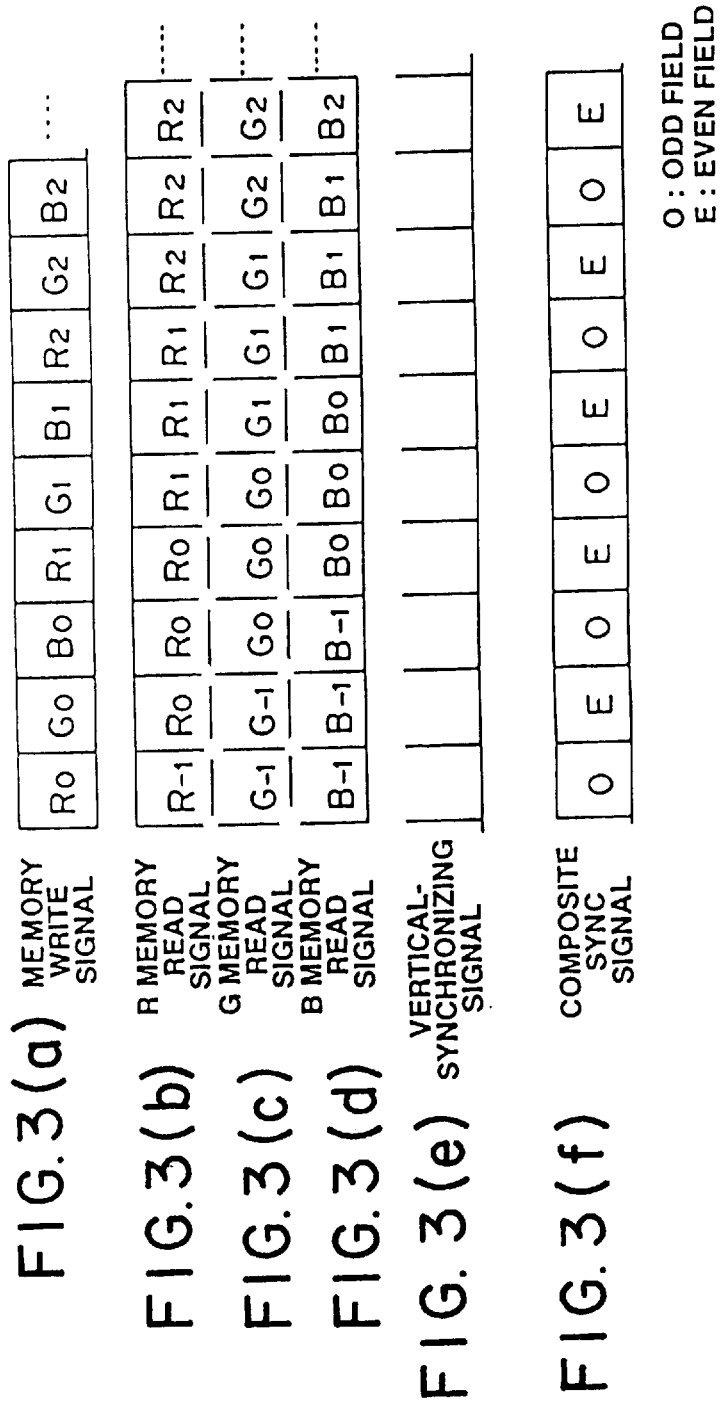

FIGS. 1 to 3 show the first embodiment of the present invention.

As shown in FIG. 1, an electronic endoscope apparatus of this embodiment has a CCD 2 as an imaging device in a distal part of an insertional part of an endoscope 1. A light guide 3 for transmitting illumination light is running through the endoscope 1. The tip of the light guide 3 lies in the distal part of the insertional part. The back end of the light guide 3 is connected to a light source apparatus 5. Illumination light generated by the light source apparatus 5 is transmitted to the distal part of the insertional part of the endoscope by means of the light guide 3, and then emitted to an object 4.

The light source apparatus 5 is constructed by placing a rotary filter 7, which is so transparent as to pass color rays of red, green, and blue, in front of a light source lamp 6. The rotary filter 7 has three areas for passing the color rays of red, green, and blue respectively. A motor 8 is coupled to a rotation axis of the rotary filter 7. The rotary filter 7 is rotated according to predetermined timing, whereby the color illumination rays of red, green, and blue are supplied sequentially to the back end of the light guide 3. An index detector 9 is located in the vicinity of the rotary filter 7. The index detector 9 detects indices indicating boundaries of the color areas of the rotary filter 7.

A processor, to which the endoscope 1 is connected, includes a pulse generator (1) 10 for generating a timing pulse for triggering driving of the CCD, and a CCD drive circuit 11 for generating a CCD driving signal. The CCD drive circuit 11 is connected to the CCD 2. In response to a timing pulse sent from the pulse generator (1) 10, the CCD drive circuit 11 generates a driving signal. With the driving signal, the CCD 2 is driven.

An output terminal of the CCD 2 is connected to a correlational double sampling (CDS) circuit 13 via an isolation transformer (1) 12 for providing coupling between isolated circuits. The CDS circuit 13 removes reset noise. An output terminal of the CDS circuit 13 is connected to each of image memories for storing video signals of red, green, and blue respectively and synchronizing the video signals; that is, an R memory 15, a G memory 16, and a B memory 17 via an A/D converter 14.

A pulse generator (2) 18 is installed to generate a timing signal for use in controlling writing and reading of the R memory 15, G memory 16, and B memory 17. The pulse generator (2) 18 is connected to the pulse generator (1) 10 via the isolation transformer (2) 19. The pulse generator (2) 18 is also connected to the motor 8 and the index detector 9 in the light source apparatus 5. Based on the output of the index detector 9, the pulse generator (2) 18 controls rotation of the rotary filter 7.

Gamma (γ) converters 20a, 20b, and 20c for applying gamma conversion to synchronized video signals, and D/A converters 21a, 21b, and 21c are connected to the output terminals of the R memory 15, G memory 16, and B memory 17. The D/A converters 21a, 21b, and 21c output analog video signals of red, green, and blue.

Referring to FIGS. 2 and 3, the operation of this embodiment will be described.

In the light source apparatus 5, light emanating from the light source lamp 6 passes through the rotary filter 7 to sequentially produce illumination rays of red, green, and blue. The illumination rays pass through the light guide 3 so as to illuminate the object 4. The timing of rotating the rotary filter 7 is controlled by the pulse generator (2) 18. An object image formed with light reflected from the object 4 is then transformed into video signals by the CCD 2.

The pulse generator (1) 10 generates a timing pulse for triggering reading of the locations in the CCD 2 associated with only one of two fields. In response to the timing pulse, the CCD drive circuit 11 outputs a driving signal to drive the CCD 2. Thus, as shown as (a) in FIG. 2, the locations in the CCD 2 associated with only one of two fields (odd field in FIG. 2) are read for each color of red, green, blue during one field period.

Video signals read sequentially for red, green, and blue from the locations in the CCD 2 associated with one of two fields are supplied to the CDS circuit 13 via the isolation transformer (1) 12. The CDS circuit 13 removes reset noise from the output signals of the CCD 2. The A/D converter 14 then converts the resultant signals into digital signals.

The pulse generator (2) 18 receives a rotary filter index signal, shown as (b) in FIG. 2, generated on the basis of indices detected by the index detector 9, and recognizes the order of red, green, and blue output signals of the CCD 2 originating from sequential illumination rays of red, green, and blue. The pulse generator (2) 18 then generates write enable signals shown as (c), (d), and (e) in FIG. 2, and then outputs the write enable signals to the R memory 15, G memory 16, and B memory 17 respectively so as to control writing of the memories. Video signals sent sequentially from the A/D converter 14 in the order of red, green, and blue are written in the R memory 15, G memory 16, and B memory 17 respectively.

The pulse generator (2) 18 sends a read control signal to each of the R memory 15, G memory 16, and B memory 17. The video signals written in the order shown as (a) in FIG. 3 are read from the memories as shown as (b), (c), and (d) in FIG. 3, and then synchronized with one another. In FIG. 3, each of squares represents one field period. Subscripts of letters R, G, and B represent time-sequential ranks of video signals being output by the CCD 2. Consequently, only video signals related to odd fields are synchronized in and read from the R memory 15, G memory 16, and B memory 17 in units of one field.

Reading video signals from the R memory 15, G memory 16, and B memory 17 is synchronized with a vertical-synchronizing signal shown as (e) in FIG. 3. The read video signals are consistent with a composite sync signal, shown as (f) in FIG. 3, sent from the pulse generator (2) 18 in terms of whether a field concerned is an odd field or an even field. By thus reading video signals related to odd fields alone, the color video signals to be synchronized can be grouped together field by field. Color video signals related to one field will therefore never include both color video signals related to an odd field and those related to an even field.

The video signals read from the R memory 15, G memory 16, and B memory 17 are subjected to gamma conversion for each of red, green, and blue by means of the gamma converters 20a, 20b, and 20c. The video signals are then converted into analog signals by the D/A converters 21a, 21b, and 21c, and then supplied as red, green, and blue video signals. When the supplied video signals are output to the monitor, a view of an object is displayed. The red, green, and blue video signals may be encoded to produce NTSC or PAL signals.

The synchronized color video signals have been grouped together field by field. Vertical jitter will therefore never occur in any video signal. This results in high-quality views.

As described above, in the field-sequential imaging type electronic endoscope apparatus of this embodiment, the CCD is driven so that the locations in the CCD associated with only one of two fields can be read. Color video signals of red, green, and blue, which are provided sequentially, are written in the image memories. The color video signals of red, green, and blue are then read from the image memories in synchronization with a vertical-synchronizing signal. The red, green, and blue video signals, which have been synchronized in and read from the image memories, can therefore be grouped together field by field. Despite the simple configuration, the electronic endoscope apparatus can provide video signals without vertical jitter for each field, and thus produce high-quality views.

Figure 4:
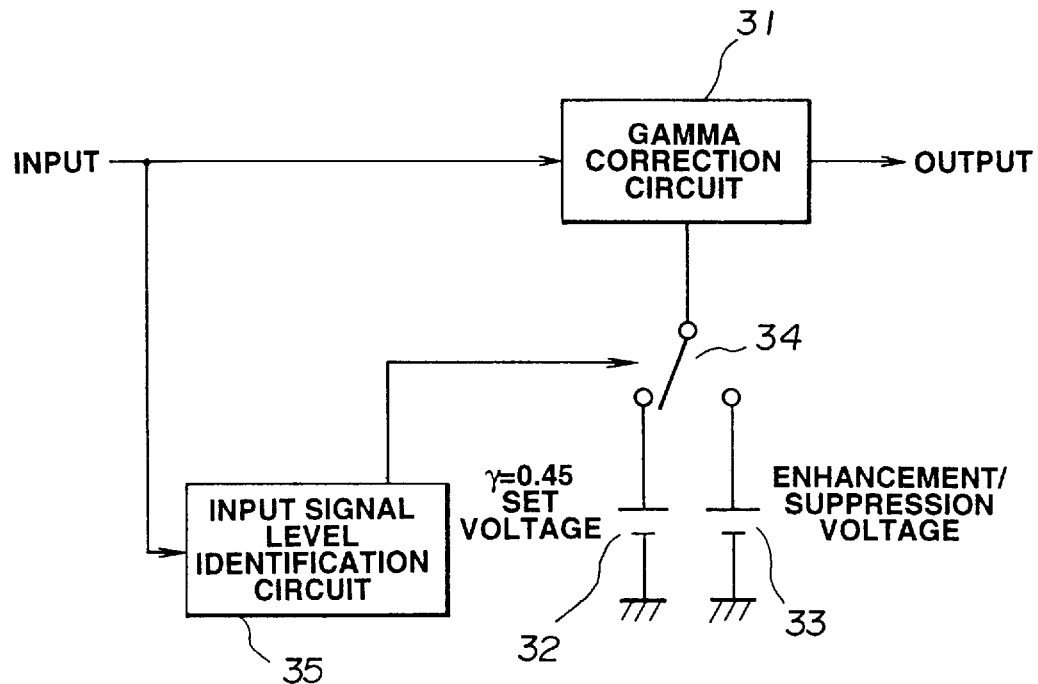
FIG. 4 is a block diagram showing an example of components of a gamma converter.

FIG. 4 shows an example of a gamma converter 20. The gamma converter has a gamma correction circuit 31. A set voltage 32 for setting a gamma value at 0.45 or an enhancement/suppression voltage 33 is supplied to the gamma correction circuit 31 through a select switch 34. The set voltage 32 fixes a gamma value to 0.45 as a result of gamma correction. The enhancement/suppression voltage 33 is a set voltage used to enhance or suppress video signals at a predetermined signal level.

Figure 5:
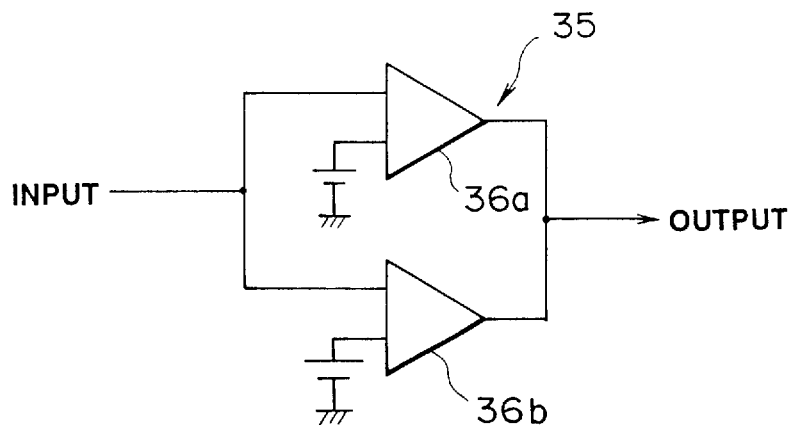
FIG. 5 is a circuit diagram showing an example of components of an input signal level identification circuit shown in FIG. 4.

The gamma converter includes an input signal level identification circuit 35. The input signal level identification circuit 35 identifies a signal level of an input video signal. The select switch 34 is controlled according to the result of the identification. The input signal level identification circuit 35 is, as shown in FIG. 5, a window comparator composed of, for example, two comparators 36a and 36b. When an input signal presents a predetermined signal level, the input signal level identification circuit 35 outputs a high-level signal.

Figure 6A:
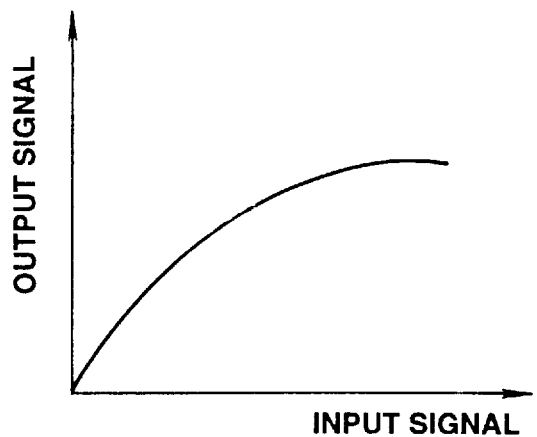
FIGS. 6(a) to 6(c) show input/output characteristics of the gamma converter shown in FIG. 4.

A video signal fed to the gamma converter enters the gamma correction circuit 31 as well as the input signal level identification circuit 35 which determines whether the signal level equals to the predetermined level. The set voltage 32 is then supplied to the gamma correction circuit 31. Thereafter, when the gamma correction circuit 31 performs gamma correction to fix a gamma value at 0.45 as usual, the output of the gamma correction circuit 31 has values such as those derived from the input/output characteristic curve shown in FIG. 6(a).

Figure 6B:
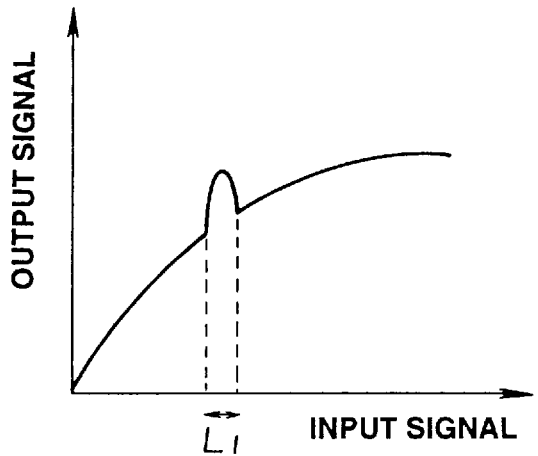
Figure 6C:
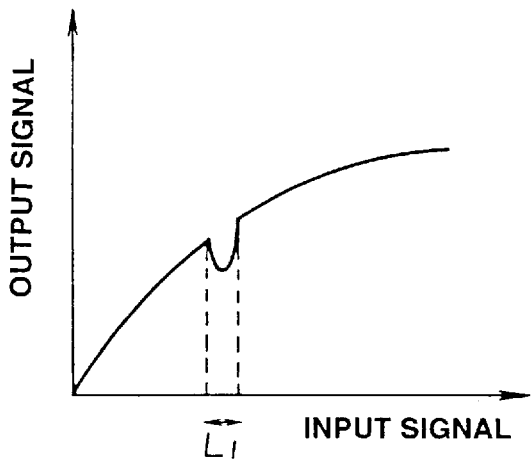

For effecting enhancement at a signal level L1 as shown in FIG. 6(b), the input signal level identification circuit 35 determines whether a video signal presents the signal level L1. When the video signal presents the signal level L1, the input signal level identification circuit 35 allows the select switch 34 to supply the enhancement/suppression voltage 33 (in this case, enhancement voltage) to the gamma correction circuit 31. Enhancement is then performed on the video signal presenting the signal level L1 according to the input/output characteristic curve shown in FIG. 6(b). For effecting suppression at the signal level L1, similarly to for effecting enhancement, when a signal presents the signal level L1, a suppression voltage is supplied to the gamma correction circuit 31. Suppression is then performed on a video signal presenting the signal level L1 according to the input/output characteristic curve shown in FIG. 6(c).

Enhancement or suppression is thus carried out only when an input video signal presents a certain signal level (or, a certain degree of contrast). This makes it possible to enhance a delicate change in contrast of an object. As a result, the delicate change in contrast becomes discernible in a view on the monitor. It should be noted that a plurality of input signal level identification circuits may be included to perform enhancement or suppression at a plurality of predetermined input signal levels.

FIGS. 7 to 9 show the second embodiment of the present invention.

In the second embodiment, a reading procedure is selected according to the number of pixels permitted by a CCD.

As shown in FIG. 7, the second embodiment includes a pixel count detector 25 for detecting the number of pixels permitted by a CCD 2. Based on the result of the detection made by the pixel count detector 25, a pulse generator (1) 26, a CCD drive circuit 27, and a pulse generator (2) 28 change their operation modes.

The other components are identical to those in the first embodiment, of which detailed description will be omitted.

In general, the diameter of an insertional part varies depending on the type of an endoscope. For example, a colonoscope or any other endoscope that may have a large diameter employs a CCD permitting a large number of pixels. A bronchoscope or any other endoscope that must be small in diameter employs a CCD permitting a limited number of pixels.

In this embodiment, the pixel count detector 25 detects the number of pixels permitted by the CCD 2. Based on the number of pixels, the pixel count detector 25 forces the pulse generator (1) 26 and CCD drive circuit 27 to change their operation modes, and thus selects a suitable CCD reading procedure. In an example of detecting the number of pixels, an identification pin or any other means for indicating the type of an endoscope may installed in a place where an endoscope is mounted. The type of an endoscope is identified using this identification pin or any other means. The number of pixels permitted by a CCD employed is recognized according to the type of an endoscope.

For a colonoscope or any other endoscope that employs a CCD permitting a large number of pixels, as shown as (a) in FIG. 2, the CCD 2 is driven so that the locations in the CCD 2 associated with only one of two fields are read during one field period. The processing to be performed thereafter is identical to that in the first embodiment.

For a bronchoscope or any other endoscope that employs a CCD permitting a limited number of pixels, the locations in the CCD associated with one frame can be read during one field period. The pulse generator (1) 26 therefore generates a timing pulse with which the locations in the CCD 2 associated with one frame consisting of an odd field and an even field will be read during one field period. In response to the timing pulse, the CCD drive circuit 27 outputs a driving signal to drive the CCD 2. The locations in the CCD 2 associated with one frame are then, as shown as (a) in FIG. 8, read for each color of red, green, and blue during one field period.

In the meantime, the pulse generator (2) 28 generates write enable signals shown as (c), (d), and (e) in FIG. 8 according to the rotary filter index signal, shown as (b) in FIG. 8, generated on the basis of indices detected by the index detector 9. When the write enable signals are output to the R memory 15, G memory 16, and B memory 17, red, green, and blue video signals provided by the A/D converter 14 are written in the R memory 15, G memory 16, and B memory 17 sequentially.

The pulse generator (2) 28 sends a read control signal to each of the R memory 15, G memory 16, and B memory 17, reads the video signals, which have been written in the order shown as (a) in FIG. 9, field by field alternately between an odd field (O) and an even field (E), and then synchronizes the video signals. During one field period corresponding to one pulse spacing indicated with one square of a memory write signal shown as (a) in FIG. 9, video signals related to one frame are written.

The video signals are read from the R memory 15, G memory 16, and B memory 17 alternately between an odd field and an even field in synchronization with a vertical-synchronizing signal shown as (e) in FIG. 9. The video signals read simultaneously from the memories are therefore grouped together field by field as shown with (b), (c), and (d) in FIG. 9, and become consistent with a composite sync signal shown as (f) in FIG. 9 in terms of whether a field concerned is an odd or even field.

As mentioned above, when a CCD permitting a limited number of pixels is employed, the locations in the CCD associated with both fields are read to produce video signals during one field period. This makes it possible to form a satisfactory view without vertical jitter using a procedure determined according to the number of pixels permitted by the CCD.

As described above, in this embodiment, either a procedure of reading the locations in a CCD associated with only one of two fields and outputting video signals or a procedure of reading the locations of the CCD associated with both fields during one field period and outputting video signals can be selected according to the number of pixels permitted by the CCD. Similarly to the first embodiment, red, green, and blue video signals synchronized in and read from image memories can be grouped together field by field. In addition, a variety of CCDs permitting different numbers of pixels can be operated effortlessly under the control of a sole circuitry. In a field-sequential imaging type electronic endoscope apparatus, a satisfactory view without vertical jitter can be produced using a simple configuration. Furthermore, imaging operations including driving and generation of video signals can be performed in a mode determined according to the number of pixels permitted by each of CCDs in a variety of endoscopes.

The other modes of operation and advantages are identical to those of the first embodiment.

In the present invention, it will be apparent that a wide range of different working modes can be formed on the basis of the invention without departing from the spirit and scope of the invention. This invention will be limited to the appended claims but not restricted to any specific working modes.

What is claimed is:

1. A field-sequential imaging type electronic endoscope apparatus having an illuminating means for illuminating an object by sequentially emitting color illumination rays with a plurality of different wavelengths, and an imaging device with odd and even fields for photoelectrically transforming an object image formed on said odd and even fields with said color illumination rays emanating from said illuminating means, said endoscope apparatus comprising:

a driving means for generating a timing pulse, selecting between said imaging device associated with odd fields and said imaging device associated with even fields, and driving said imaging device so as to selectively read a plurality of locations in said imaging device associated with only one of the odd and even field;

image memory means for storing video signals representing said object image formed with said color illumination rays and having been read from said imaging device; and memory control means for reading said color video signals from said image memory means in synchronization with a vertical-synchronizing signal.

2. A field-sequential imaging type electronic endoscope apparatus having an illuminating means for illuminating an object by sequentially emitting color illumination rays of red, green, and blue with three different wavelengths, and an imaging device with odd and even fields for photoelectrically transforming an object image formed on said odd and even fields with said color illumination rays emanating from said illuminating means, said endoscope apparatus comprising:

a driving means for generating a timing pulse, selecting between said imaging device associated with odd fields and said imaging device associated with even fields, and driving said imaging device so as to selectively read a plurality of locations in said imaging device associated with only one of the odd and even fields;

image memory means for storing video signals representing said object image formed with said color illumination rays of red, green, and blue, and having been read from said imaging device; and memory control means for reading said color video signals from said image memory means in synchronization with a vertical-synchronizing signal.

3. An electronic endoscope apparatus according to claim 1, wherein said driving means drives said imaging device so as to read said plurality of locations in said imaging device associated with only one of two fields during one field period during which video signals scan one field and to read said plurality of locations therein associated with the same one of two fields for each field.

4. An electronic endoscope apparatus according to claim 1, wherein said driving means reads said plurality of locations in said imaging device associated with an odd field or an even field alone during one field period, during which video signals scan one field, in synchronization with a timing signal fed when said illuminating means starts emitting color illumination rays, and sequentially reads the locations therein associated with the same one of two fields; that is, either an odd field or an even field for each field.

5. An electronic endoscope apparatus according to claim 1, wherein said memory control means allow said image memory means to store said video signals, which represent said object image formed with said color illumination rays and have been read from said imaging device, in synchronization with a timing signal fed when said illuminating means starts emitting color illumination rays, and said memory control means read color video signals related to one of two fields from said image memory means in synchronization with a vertical-synchronizing signal, and synchronizes said color video signals that are consistent with one another in terms of whether a field concerned is an odd field or an even field.

6. An electronic endoscope apparatus according to claim 1, further comprising a pixel count detecting means for detecting a number of pixels permitted by said imaging device, wherein:

based on the result of the detection made by said pixel count detecting means, depending on whether an imaging device permitting a large number of pixels or an imaging device permitting a limited number of pixels is employed, said driving means and said memory control means change their operation modes.

7. An electronic endoscope apparatus according to claim 6, wherein when the result of the detection made by said pixel count detecting means reveals that an imaging device permitting a limited number of pixels is employed, said driving means changes its operation modes so that said driving means drives said imaging device so as to read said plurality of locations in said imaging device associated with one frame consisting of an odd field and an even field during one field period during which video signals scan one field, and said memory control means change their operation modes so that said memory control means allow said image memory means to store color video signals representing said object image formed with said color illumination rays and having been read from said imaging device, read color video signals from said image memory means field by field alternately between an odd field and an even field in synchronization with a vertical-synchronizing signal, and synchronize said color video signals that are consistent with one another in terms of whether a field concerned is an odd field or an even field.

* * * * *